(12) United States Patent
Goldhahn et al.

(10) Patent No.: US 12,181,365 B2
(45) Date of Patent: Dec. 31, 2024

(54) METHOD OF MANUFACTURING A SENSOR SET-UP FOR DETERMINING AT LEAST ONE PRESSURE OF A FLUID MEDIUM

(71) Applicant: Robert Bosch GmbH, Stuttgart (DE)

(72) Inventors: Clemens Goldhahn, Gotha (DE); Lutz Baetzold, Wutha-Farnroda (DE); Marcel Reinhardt, Goldbach (DE); Ronny Wolf, Schmalkalden (DE); Tilman Stark, Eisenach (DE); Ralf Wenk, Leina (DE)

(73) Assignee: ROBERT BOSCH GMBH, Stuttgart (DE)

( * ) Notice: Subject to any disclaimer, the term of this patent is extended or adjusted under 35 U.S.C. 154(b) by 703 days.

(21) Appl. No.: 17/311,213

(22) PCT Filed: Oct. 22, 2019

(86) PCT No.: PCT/EP2019/078681
§ 371 (c)(1),
(2) Date: Jun. 4, 2021

(87) PCT Pub. No.: WO2020/126160
PCT Pub. Date: Jun. 25, 2020

(65) Prior Publication Data
US 2022/0018726 A1 Jan. 20, 2022

(30) Foreign Application Priority Data
Dec. 17, 2018 (DE) .......................... 102018221984.2

(51) Int. Cl.
*G01L 9/00* (2006.01)
*C03C 27/02* (2006.01)
*H05B 6/36* (2006.01)

(52) U.S. Cl.
CPC ............ *G01L 9/0048* (2013.01); *C03C 27/02* (2013.01); *G01L 9/0008* (2013.01); *G01L 9/0016* (2013.01); *H05B 6/367* (2013.01)

(58) Field of Classification Search
CPC ... G01L 9/0048; G01L 9/0008; G01L 9/0016; C03C 27/02; H05B 6/367
See application file for complete search history.

(56) References Cited

U.S. PATENT DOCUMENTS

| 6,122,976 A | 9/2000 | Hallberg et al. |
| 2008/0225924 A1* | 9/2008 | Ladirat ................. H05B 6/367 373/152 |
| 2017/0038269 A1* | 2/2017 | Hio ........................ G01L 9/0048 |

FOREIGN PATENT DOCUMENTS

| CN | 2313215 Y | 4/1999 |
| CN | 1282868 A | 2/2001 |

(Continued)

OTHER PUBLICATIONS

DE 10 2006 023724 A1 (Siber) Jan. 24, 2008 (English language machine translation). [online] [retrieved Nov. 20, 2023]. Retrieved from: Espacenet. (Year: 2008).*

(Continued)

*Primary Examiner* — A. Dexter Tugbang
(74) *Attorney, Agent, or Firm* — NORTON ROSE FULBRIGHT US LLP; Gerard A. Messina

(57) ABSTRACT

A method of manufacturing a sensor set-up for determining at least one pressure of a fluid medium. The method includes: a) providing a blank of a sensor set-up including at least one pressure connection, the pressure connection including at least one pressure deformation element made up of at least one material suitable for induction; b) positioning at least one glass element onto a surface of the pressure deformation element; c) measuring at least one temperature of the pressure deformation element using at least one (Continued)

pyrometer; d) inducing a voltage in the pressure deformation element using at least one inductor in such a manner, that the glass element melts and a glass layer forms on the pressure deformation element; e) positioning a sensor element onto the glass layer in such a manner, that an integral bond forms between the sensor element and the glass layer.

10 Claims, 4 Drawing Sheets

(56) References Cited

FOREIGN PATENT DOCUMENTS

| | | | |
|---|---|---|---|
| CN | 101356426 | A | 1/2009 |
| CN | 102331322 | A | 1/2012 |
| CN | 102460101 | A | 5/2012 |
| DE | 102006023724 | A1 | 1/2008 |
| DE | 112017001287 | T5 | 12/2018 |
| EP | 2548931 | A2 | 1/2013 |
| EP | 3088859 | A1 | 11/2016 |
| IN | 102636301 | A | 8/2012 |
| JP | 2000298071 | A * | 10/2000 |
| JP | 2017032389 | A | 2/2017 |
| WO | 2009067449 | A1 | 5/2009 |
| WO | 2016043670 | A1 | 3/2016 |

OTHER PUBLICATIONS

Ham et al, "Design, fabrication, and characterization of piezoresisitve strain gage-based pressure sensors for mechatronic systems," 2015 IEEE International Workshop of Electronics, Control, Measurement, Signals and their Application to Mechatronics (ECMSM), Liberec, Czech Republic, 2015, pp. 1-5. (Year: 2015).*

Synthetic Diamond Tools Handbook 2014, Song Minqqing, e tal. (editors) etc., Metallurgical Industry Press, Ch. 6: High-Frequency Welding Equipment [with English Abstract], pp. 1-6.

Practical Heat Treatment Handbook, (2013, 2nd Rev.) Shanghai Heat-Treatment Association, Shanghai Scientific & Technical Publishers, Bo Xintao, et al. (editors), Ch. 4: Induction Heat Treatment, [with English excerpt,] pp. 1-6.

International Search Report for PCT/EP2019/078681, Issued Jan. 30, 2020.

Konrad Reif "Sensors in the Motor Vehicle," 2010 1st Edition Version, pp. 134-136.

* cited by examiner

METHOD OF MANUFACTURING A SENSOR SET-UP FOR DETERMINING AT LEAST ONE PRESSURE OF A FLUID MEDIUM

BACKGROUND INFORMATION

Numerous methods of manufacturing a sensor set-up for determining at least one pressure of a fluid medium are known from the related art. The devices may be, in particular, micromechanical pressure sensors, as are described in, for example, from Konrad Reif (ed.): Sensors in the Motor Vehicle, 2nd Edition, 2012, pages 134-136.

PCT Patent Application No. WO 2009/067449 A1 describes a combined fluid and vapor-pressure sensor set-up, including a housing and a mounting section for coupling the housing to a fuel-pump module flange, which defines an interface between an inside and an outside of a fuel tank. A hydrostatic pressure sensor is accommodated in a recess in the housing, in order to measure a hydrostatic pressure of a fuel in a fuel tank. A vapor pressure sensor is accommodated in the recess in the housing, in order to measure a vapor pressure of a fuel vapor in the fuel tank. An electrical connector is connected to the housing, in order to provide power to the hydrostatic pressure sensor and the vapor pressure sensor.

Up to now, pressure sensors have normally been designed in such a manner, that an optimum result is obtained for a particular pressure range, for example, for a pressure range of 0 bar to 100 bar. In addition, pressure sensors are known, which are designed to measure different pressure ranges, in that in a sensor housing, two pressure sensors are installed, and the two pressure ranges to be measured are directed separately to them.

A further development of today's pressure sensors requires the implementation of larger measuring regions. So-called seal glass bonding may be used for joining a sensor chip to a diaphragm of a pressure sensor. In this context, the heating is normally accomplished via thermal contact conduction.

In spite of the numerous advantages of the conventional methods of the related art for manufacturing a sensor set-up to determine at least one pressure of a fluid medium, they still have potential for improvement. Thus, the conventional methods in the related art normally include long tempering operations. This may render the corresponding equipment uneconomical for large-scale production. Furthermore, a precise geometry of the glass layer is normally needed for a strong bond and a reproducible characteristic of the sensor set-up.

SUMMARY

In accordance with example embodiments of the present invention, a method of manufacturing a sensor set-up for determining at least one pressure of a fluid medium, as well as a sensor set-up for determining at least one pressure of a fluid medium, are provided, which are able to overcome the disadvantages of conventional methods and devices at least partially.

In a first aspect of the present invention, a method of manufacturing a sensor set-up for determining at least one pressure of a fluid medium is provided. The method in accordance with an example embodiment of the present invention may include the method steps, which are described in the following. The method steps may preferably be carried out in the given order. In this connection, one or even more method steps may be carried out simultaneously or in a temporally overlapping manner. In addition, one, a plurality, or all of the method steps may be carried out once or even repeatedly. Furthermore, the method may include even more method steps.

The method includes the following steps:
a) providing a blank of a sensor set-up; the blank of the sensor set-up including at least a pressure connection, the pressure connection further including at least one pressure deformation element, the pressure deformation element being made up of at least one material suitable for induction;
b) positioning at least one glass element on a surface of the pressure deformation element;
c) measuring at least one temperature of the pressure deformation element with the aid of at least one pyrometer;
d) inducing a voltage in the pressure deformation element with the aid of at least one inductor in such a manner, that the glass element melts and a glass layer forms on the pressure deformation element;
e) positioning a sensor element on the glass layer in such a manner, that an integral bond forms between the sensor element and the glass layer.

The method may further include inserting the pressure connection into a holding fixture capable of being cooled and cooling the pressure connection with the aid of the holding fixture capable of being cooled.

Within the scope of the present invention, a "sensor set-up" may be understood as any device, which may determine the pressure, and which may generate, for example, at least one measuring signal corresponding to the pressure, for example, an electrical measuring signal, such as a voltage or a current.

In particular, the sensor set-up may be configured to determine, in particular, to measure, a pressure p of the fluid medium lying within a pressure range. For example, the pressure range may be a range $0 \le p \le 5000$ bar, preferably, a range $0 \le p \le 3500$ bar. In particular, the sensor set-up may be configured to determine pressure p within the above-mentioned pressure range so as to have a maximum permissible deviation of the measuring result from the pressure actually prevailing. In this context, the maximum permissible deviation may be specified in % of the pressure actually prevailing, for example, of the nominal pressure of the fluid medium.

The sensor system may be configured, in particular, for use in a motor vehicle. For example, the sensor set-up may be configured for use in a power train and/or a transmission and/or a thermal management system of a motor vehicle, in particular, of an electric vehicle. However, other embodiments and areas of application of the sensor set-up are also theoretically possible.

The term "blank" denotes any object, which is intended for further processing. Thus, the blank may have one or more components. During the further processing, the components may be joined to further components. Alternatively, and/or in addition, one or more components of the blank may be changed, for example, reshaped, during the further processing. Other operations are also possible.

Within the scope of the present invention, a "pressure connection" may be understood as an element, which has at least two ends that are interconnected by a hollow space, for example, a tube, and which is configured to transmit a pressure with the aid of a fluid, in particular, by a liquid and/or a gas, preferably, with the aid of the fluid medium, from a first end of the pressure connection to at least a second end of the pressure connection. In particular, the pressure connection may be configured to have dimensional stability, that is, to retain its geometric shape even under the load of the pressure of the fluid. In particular, the pressure connection may include a material, which has a strength greater than the pressure applied or applicable by the fluid medium. In particular, the pressure connection may also be made of any other dimensionally stable material.

The pressure connection may have an oblong, basic shape. The pressure connection may include at least one bore hole, which extends along the longitudinal axis of the pressure connection. The term "bore hole" basically denotes a depression, in particular, a round depression or an opening, which is produced by a rotating tool. The bore hole may be, in particular, a cylindrical bore hole. The bore hole may form an interior chamber accessible to the fluid medium. In addition, a surface of the pressure connection may include a winding for the attachment of the pressure connection to a further element.

The pressure connection may also include at least one first end and at least one second end. The terms "first end" and "second end" are to be regarded as pure descriptions, without indicating an order or ranking, and, for example, without ruling out the possibility that a plurality of types of first ends and/or second ends or, in each instance, exactly one type, may be provided. Furthermore, additional ends, such as one or more third ends, may be provided. In particular, the first end and the second end may each include end faces of the pressure connection. The pressure deformation element may be placed at the second end of the pressure connection.

Within the scope of the present invention, a "pressure deformation element" may be understood as a component, which is designed to change its form or shape under the influence of an external force, in particular, an external pressure. Therefore, deformation of the component may take place. The deformation may be, in particular, reversible deformation. The deformation may manifest itself as, in particular, linear deformation or expansion. Thus, the pressure deformation element may be designed to absorb a pressure of the fluid medium. Consequently, the pressure deformation element may be referred to as a pressure sensor. In particular, the pressure sensor may have at least one, preferably, a plurality of, measuring surfaces.

The pressure deformation element may include at least one diaphragm or take the form of a diaphragm. Within the scope of the present invention, a "diaphragm" may be understood as any thin interface, which forms a biaxially loaded surface. For example, the diaphragm may be positioned in such a manner, that it may deform elastically, that is, reversibly, due to the pressure of the fluid medium. In particular, an expression of the deformation of the diaphragm may be a function of the pressure of the fluid medium. For example, the deformation of the diaphragms may correlate with the pressure of the fluid medium.

As explained above, the pressure deformation element is made of at least one material suitable for induction. Within the framework of the present invention, a "material suitable for induction" may be understood as any material, in which an electric field is formed in response to a change in a magnetic flux density. Therefore, the material suitable for induction may also be referred to as a material suitable for electromagnetic induction. The material suitable for induction may include, in particular, at least one magnetizable steel. Other materials are also possible. In particular, the pressure deformation element and the pressure connection may be formed in one piece.

Within the scope of the present invention, the term "holding fixture" denotes any device, which is configured to receive an arbitrary object, in particular, in such a manner, that the object is enclosed by the device at least partially. Therefore, the holding fixture may include, in particular, a recess in an interior of the holding fixture. In addition, the holding fixture may have an at least substantially flat surface, in order for the object to be able to rest on the surface.

The term "holding fixture capable of being cooled" denotes, in particular, a holding fixture, which is shaped in such a manner, that a temperature of the holding fixture, in particular, a temperature of an interior of the holding fixture and/or a temperature of the object held in the holding fixture, may be reduced. Thus, the holding fixture may include a cooling device or be operatively connected to a cooling device. The pressure connection may be cooled, in particular, to a temperature of 10° C. to 25° C. with the aid of the holding fixture capable of being cooled.

A stable temperature distribution in the pressure connection is attained due to the holding fixture capable of being cooled. Consequently, control may be simplified. In addition, heat conduction into other regions of the blank of the sensor set-up may be prevented or at least reduced, and variations resulting from this may be prevented or at least reduced, as well.

The holding fixture capable of being cooled may be shaped in such a manner, that the first end of the pressure connection rests on a surface of the holding fixture capable of being cooled. In particular, the holding fixture capable of being cooled may include a through-opening, in particular, a through-hole. The through-opening may be formed in such a manner, that it extends from an outer surrounding area of the holding fixture capable of being cooled to the upper surface of the holding fixture capable of being cooled. Consequently, a temperature of the diaphragm may be measured through the through-hole with the aid of the pyrometer, which is described below in even more detail. The holding fixture capable of being cooled may be shaped in such a manner, that at least 5%, preferably, at least 10%, and particularly preferably, at least 20% of a length of the pressure connection is surrounded by the holding fixture capable of being cooled. The term "to cool" denotes any operation, in which a temperature of an arbitrary object is reduced.

The term "pyrometer" denotes any radiation thermometer, which is configured for contactless temperature measurement. It is, for example, a quotient pyrometer or a total radiation pyrometer. The pyrometer may include, in particular, an optical head. The pyrometer may be configured to measure the temperature of the pressure deformation element, in particular, of the diaphragm, through the bore hole of the holding fixture capable of being cooled. Thus, the pyrometer may be situated below the first end of the pressure connection. In particular, a depth of the bore hole may be greater than three times the diameter of the bore hole. This allows an ideal black-body radiator to be approximated, so that the temperature of the diaphragm may be measured directly on a metallic surface of the pressure connection, in particular, without any further measures. Due to this, mounting of the sensor element may be simplified, in particular, rendered possible in an unhindered manner.

In particular, the basic shape of the glass element may be cylindrical. In particular, the glass element may have a diameter of 0.5 mm to 3 mm. In addition, the glass element may have a thickness of 5 μm to 100 μm. The glass element may have, in particular, a melting temperature of 300° C. to 550° C. The glass element may be made of at least one material selected from the group including: leaded or lead-free glasses having the indicated melting temperature.

As explained above, the glass element is positioned on the surface of the pressure deformation element. This may be accomplished, for example, by printing a glass paste onto the surface of the pressure deformation element.

The term "inductor" denotes any transmitter of a current from an induction device to a workpiece. The inductor may take the form of, for example, a flat coil, coil, or even a single winding. In particular, the inductor may be operatively connected to a high-frequency generator. In addition, the high-frequency generator may be operatively connected to the pyrometer with the aid of a PID controller. The high-frequency generator may be configured to supply the inductor with voltage. The basic shape of the inductor may be toroidal. Therefore, the inductor may have a hollow space. The pressure connection, in particular, the second end of the pressure connection, may be situated in the hollow space. In particular, the diaphragm may be situated in the hollow space of the pressure connection. The inductor may be positioned around the diaphragm. The inductor may be positioned at a distance of 0.1 mm to 5 mm from the diaphragm. A voltage is induced in the diaphragm by the inductor; the voltage resulting in the heating of the diaphragm due to the eddy currents generated. A particularly small heating zone may be produced in this manner. In addition to rapid and efficient heating, a very short control path may also be formed.

The heating of the pressure deformation element, in particular, of the diaphragm, may include a heating phase, a holding phase and a cooling phase. The heating phase, a holding phase, and the cooling phase may be parameterizable in curvature and time. In this manner, the option of adapting the method to individual characteristics of the glass element is produced. Due to temperature sensing in direct proximity to the glass element, that is, the glass layer, stable tempering may be produced in a holding phase, which means that successful use of the sensor element is promoted.

The heating phase may include, in particular, a linear increase in the temperature as a function of time. In particular, the heating phase may take place over a time frame of 0.5 s to 20 s, preferably, 1 s to 10 s. In particular, the holding phase may take place over a time frame of 2 s to 50 s, preferably, 5 s to 30 s. During the holding phase, the temperature may be at least substantially constant as a function of time. The diaphragm may be heated to a temperature of 200° C. to 900° C., in particular, 300° C. to 600° C. Thus, during the holding phase, the temperature may be 200° C. to 900° C., in particular, 300° C. to 600° C., as a function of time. The cooling phase may include, in particular, an exponential fall of the temperature as a function of time.

Within the scope of the present invention, a "sensor element" may be understood as any element having at least one sensing function. In particular, the sensor element may be formed in one piece and may take the form of, for example, a semiconductor chip or ceramic chip. Therefore, the sensor element may also be referred to as a sensor chip.

Within the scope of the present invention, a "form-locked connection" may be understood as any connection of at least two elements, where due to the geometric shape of the at least two elements, a relative movement of the two elements with respect to each other is prevented in at least one direction. For example, two mating elements, in particular, two elements, which have a corresponding shape or form, may have a form-locked connection to each other.

"Surface profiling" may be understood as arbitrary shaping of a surface with the aid of at least one pattern and/or with the aid of at least one structure. The pattern may be regular or also irregular. Consequently, in a cross-sectional view, the surface may include correspondingly shaped projections and depressions. Thus, the surface profiling may also be referred to as surface patterning or as surface structure. The surface profiling may be produced, in particular, with the aid of at least one method, for example, with the aid of a method based on a laser technology.

The term "producing the at least one surface profile" may include at least one method step, in which the surface profiling is introduced into the surface of the diaphragm. In particular, the surface profiling may be introduced into the surface, by introducing depressions and projections with the aid of a laser method. Thus, producing the surface profiling may be referred to as surface pretreatment.

The surface profiling may be produced on at least one surface of the diaphragm. In particular, the surface may be an exposed surface. An "exposed surface" is to be understood as any surface of an element, which borders on an outer surrounding area of the element. Therefore, the exposed surface may also be referred to as an interface. Consequently, the exposed surface may be a processed surface.

For example, the surface profiling may be microprofiling and/or nanoprofiling. The terms "microprofiling" and/or "nanoprofiling" are to be understood as any surface profiling, in which the projections and/or depressions of the surface have dimensions, which are in the range of 1 or more micrometers, that is, in the range of 1 μm to 1000 μm, preferably, in the range of 2 μm to 20 μm; and in the range of several nanometers, in particular, in the range of 10 nm to 1000 nm, respectively. The dimensions may be, in particular, a height, a width and/or a depth of the projections and/or depressions.

At least part of the surface profiling may be substantially periodic surface profiling. Within the scope of the present invention, the term "periodic surface profiling" is to be understood to mean that profiling, in particular, patterning, of an arbitrary exposed surface occurs regularly and periodically on the exposed surface, that is, repeatedly, in a recurrent order.

In particular, as explained above, the surface profiling may include the layout of projections and depressions, which occur on the exposed surface repeatedly in a recurrent order. The layout of projections and depressions may form a unit, and a plurality of the units may be situated on the exposed surface. In this connection, the term "substantially" is to be understood to mean that irregularities in the distances between the projections and depressions may occur. For example, a distance between a first projection and a first depression may have a dimension, which is 0.01% to 0.5% greater or less than a mean dimension, which is averaged over a plurality of distances between the projections and the depressions of the surface profiling, for example, over at least 10 distances, preferably, over at least 50 distances. In addition, shapes of the projections and/or of the depressions of the pattern may differ. For example, a height and/or a width of a projection and/or a depression may have a dimension, which is 0.01% to 0.5% greater or less than a mean dimension, which is averaged over a plurality of heights and/or widths, in particular, over at least 10 heights and/or widths, preferably, over at least 50 heights and/or widths.

The surface profiling may have, in particular, a plurality of elements. The elements may be formed as a projection on the exposed surface. In particular, the elements may be isolated elements, which are at a distance from adjacent elements. The elements may be arranged so as not to make contact with each other. Alternatively, the elements may touch at least partially. The elements may extend from the exposed surface of the diaphragm, in particular, the elements may extend transversely, preferably, perpendicularly, to the exposed surface of the diaphragm.

The elements may have, in particular, at least one shape selected from the group made up of: a columnar shape; a cylindrical shape; a conical shape, in particular, a frustoconical shape; a tetrahedral shape, in particular, a pyramidal shape; a prismal shape, in particular, a right-parallelepiped shape, in particular, a cube shape. The column may have, in particular, a basic shape selected from the group made up of: a circular basic shape, a square basic shape, a right-parallelepiped basic shape, a hexagonal basic shape. Other shapes are also possible. At least one dimension of the elements selected from the group made up of: a length, a width, a diameter, a height; may be 10 nm to 800 nm, preferably, 50 nm to 700 nm.

Consequently, the surface profiling may include at least one pattern selected from the group made up of: a columnar pattern; a conical pattern, in particular, a frustoconical pattern; a pyramidal pattern, a cubic pattern, a strip-shaped pattern; a lamellar pattern; a hill-shaped pattern; a circular pattern; a lattice pattern; an undulated pattern; a corrugated pattern.

In addition, the elements may be positioned on the surface at at least one distance from each other. The distance may be, for example, 10 nm to 800 nm, preferably, 50 nm to 700 nm, particularly preferably, 100 nm to 500 nm. Alternatively, the distance may be 1 μm to 100 μm, preferably, 2 μm to 20 μm. Within the scope of the present invention, the term "distance" is to be understood as a spatial distance between two or more elements. In particular, the distance may be a distance between two axes of symmetry of the elements; the axes of symmetry extending perpendicularly to the surface of the solid electrolyte. In addition, the elements may be positioned on the exposed surface of the solid electrolyte in such a manner, that gaps form between the elements. The term "gap" is to be understood as any free space or any free volume between at least two elements. In particular, the elements on the exposed surface may be formed as projections, and the gaps may be formed between the projections.

In a further aspect of the present invention, a sensor set-up for determining at least one pressure of a fluid medium is provided, which is manufactured in accordance with a method, which has been described above or is described below.

The method in accordance with an example embodiment of the present invention may have numerous advantages over conventional methods. The method of the present invention may be used for economically implementing mass production of a glazed-on sensor element. Requirements, such as a low cycle time and a reduction in prime cost, as well as high energy efficiency, may be taken into account considerably more effectively than with conventional thermal contact conduction methods.

In particular, as an alternative to conventional methods, an inductive heating method including pyrometric temperature measurement is proposed. The method of the present invention may replace conventional thermal contact conduction systems in the so-called "seal glass bonding method." Temperature is measured pyrometrically on metallic surfaces, in particular, on exposed metallic surfaces, very small regions are tempered, and the temperature distribution in the component is stabilized, in order to achieve repeatability.

A heating time may be reduced. In this manner, parallelization of many units may be omitted, through which, in turn, suitability for mass production results. In addition, the control path may be shortened, which means that it is possible to control temperature and select heating and cooling curves in a more exact manner. Furthermore, a higher efficiency and a smaller heating zone may be achieved, from which a lower power demand results.

The introduction of surface profiling allows a precise geometry of the glass to be obtained, in particular, during the mass production of pressure sensors. Requirements, such as a lower cycle time and lower costs, as well as the option of adjusting a critical height of the glass, may be taken into account considerably more effectively.

The resulting geometry of the glass layer may be controlled in the melting operation, using the positioning of raw material and surface wetting behavior. In turn, the wetting behavior is influenced directly by the surface pattern, which may advantageously be produced by a laser method or sandblasting method. A flow behavior of the glass is a function of the patterning. Thus, the glass recedes from certain surfaces, while it wets other surfaces more heavily.

Consequently, a defined geometry of the melted glass on the diaphragm may be produced theoretically in a more cost-effective manner, since no additional cycle time or demand on suppliers is necessary. A height of the glass layer may be influenced by contraction of the glass onto a smaller surface or a heavier flow. This enables more economical methods for depositing the glass, since a target height does not have to be attained immediately (for example, one times the paste pressure instead of many times the paste pressure, with intermediate drying). In addition, a geometry is flexibly adjustable, and a cleaning operation and a paste pressure are simpler to implement.

BRIEF DESCRIPTION OF THE DRAWINGS

Further optional details and features of the present invention are derived from the following description of preferred exemplary embodiments, which are represented schematically in the figures.

DETAILED DESCRIPTION OF EXAMPLE EMBODIMENTS

Figure 1:
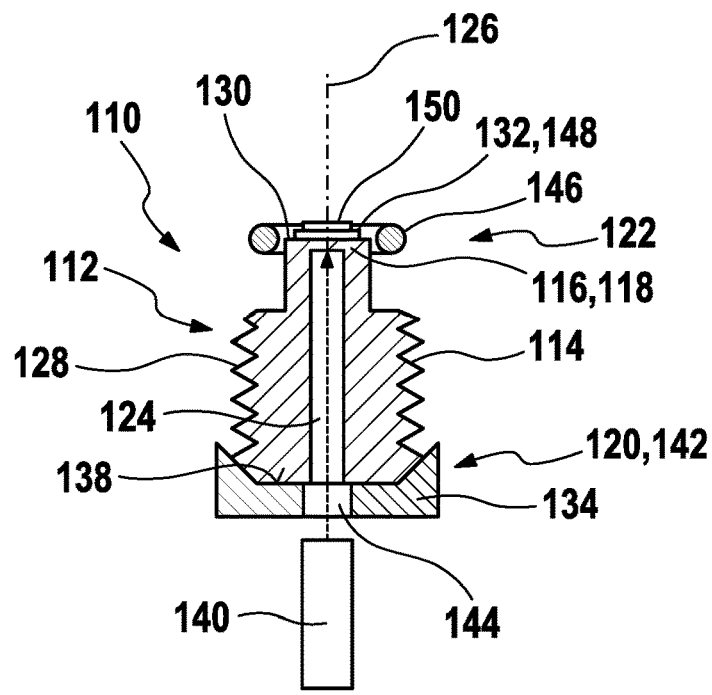
FIG. 1 shows a diagrammatic sketch for an exemplary embodiment of a method of the present invention for manufacturing a sensor set-up.

FIG. 1 shows a diagrammatic sketch for an exemplary embodiment of a method of the present invention for manufacturing a sensor set-up 110. In a first step, a sensor set-up blank 112 is provided. The blank of the sensor set-up includes a pressure connection 114, as well as a pressure deformation element 116. Pressure deformation element 116 may take the form of, in particular, a diaphragm 118. Pressure connection 114 may include a first end 120, as well as a second end 122. Pressure deformation element 116 may be situated at second end 122. In particular, pressure deformation element 116 and pressure connection 114 may be formed in one piece. In addition, the pressure connection may include at least one bore hole 124. Bore hole 124 may extend along a longitudinal axis 126 of pressure connection 114, in particular, from first end 120 into an interior of pressure connection 114. Furthermore, the pressure connection may include a winding 128. Winding 128 may be configured to attach pressure connection 114 to another element (not shown). A glass element 132 may be attached to a surface 130 of pressure deformation element 116, for example, by adhesive bonding. Pressure connection 114 may subsequently be inserted into a holding fixture 134 capable of being cooled. In particular, first end 120 of the pressure connection may rest on a surface 138 of the holding fixture 134 capable of being cooled. Pressure connection 114 may be cooled with the aid of the holding fixture 134 capable of being cooled. A temperature of pressured deformation element 116 may be measured with the aid of a pyrometer 140. Pyrometer 140 may be positioned beneath an end face 142, in particular, beneath first end 120, of pressure connection 114. Holding fixture 134 capable of being cooled may have a through-opening 144. Therefore, the temperature of pressure deformation element 116 may be measured by pyrometer 140 through bore hole 124 and through through-opening 144. A voltage may be induced in pressure deformation element 116 with the aid of an inductor 146. Inductor 146 may be operatively connected to a high-frequency generator. The voltage may produce warming of pressure deformation element 116 and/or of glass element 132, in particular, due to generated eddy currents. Inductor 146 may be toroidal, in particular, circular ring-shaped, and situated at a distance from pressure deformation element 116. Glass element 132 may melt, and a glass layer 148 may form on pressure deformation element 116. A sensor element 150 may be positioned on glass layer 148. An integral connection may form between sensor element 150 and glass layer 148.

Figure 2:
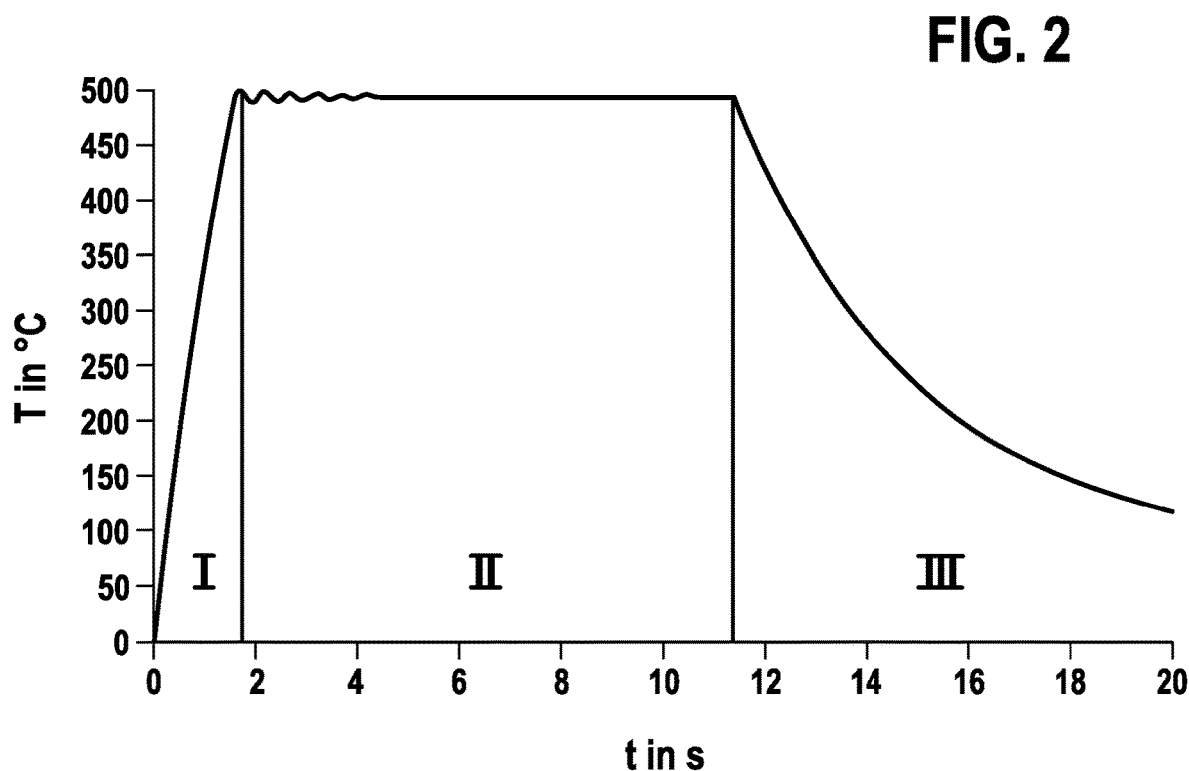
FIG. 2 shows an example of a temperature characteristic of a method in accordance with the present invention for manufacturing a sensor set-up.

FIG. 2 shows an example of a temperature characteristic of a method of the present invention for manufacturing a sensor set-up 110. Temperature T is shown as a function of time t. The method of the present invention is characterized by a heating phase I, a holding phase II, and a cooling phase III. In addition to a setpoint temperature (20° C. to 800° C.), the heating phase, the holding phase and the cooling phase are parameterizable in curvature and time, using control engineering. In this manner, the manufacturing method may be adjusted optimally to the individual requirements of the glass element. Stable tempering in the holding phase, which is necessary for successfully mounting the sensor element, results due to the measurement of temperature in direct proximity to the glass element.

FIGS. 3A-3I show schematic representations of the influence of surface profiling on the method of the present invention for manufacturing a sensor set-up 110. In all of the figures, pressure deformation element 116 and glass element 132 and/or glass layer 148 are shown, in each instance, in a top view (on the left) and in a side view (on the right).

During a surface pretreatment, different surface profiles 152 may be applied to surface 130 of pressure deformation element 116, in particular, with the aid of a laser. Together with a geometry of glass element 132, different geometries and heights of glass layer 148 may be generated, using a defined temperature gradient. Ultimately, certain geometries of glass layer 148 influence the parameters of the characteristic curve and its reproducibility in sensor set-up 110. In addition, it is now possible to attain glass thicknesses of glass layer 148, which are not possible by just mounting glass element 132.

Figure 3A:
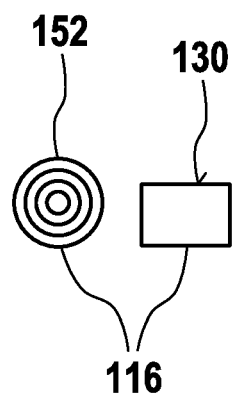
FIGS. 3A-3I shows schematic representations of the influence of surface profiling on the method in accordance with an example embodiment of the present invention for manufacturing a sensor set-up.
Figure 3B:
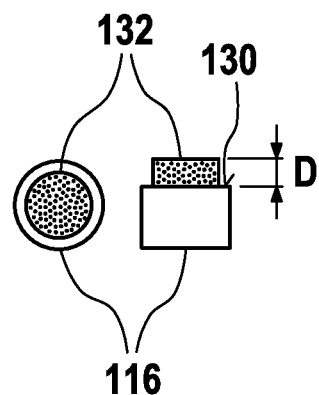
Figure 3C:
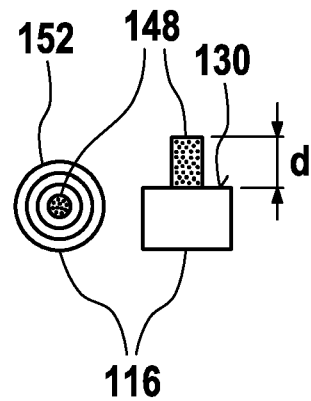

FIG. 3A shows an untreated surface 130 of pressure deformation element 116. The annular structure results, for example, from preliminary operations, such as, in particular, turning operations. In FIG. 3B, the application of glass element 132 is shown. The melting of glass element 132, which allows a glass layer 148 to form on surface 130, is shown in FIG. 3C. Glass layer 148 has a greater thickness d than glass element 132 (thickness D), since the glass contracts due to the pattern.

Figure 3D:
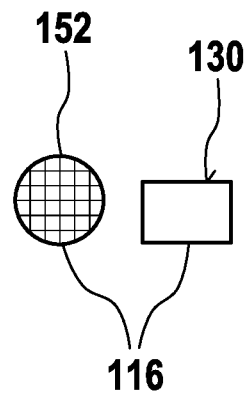
Figure 3E:
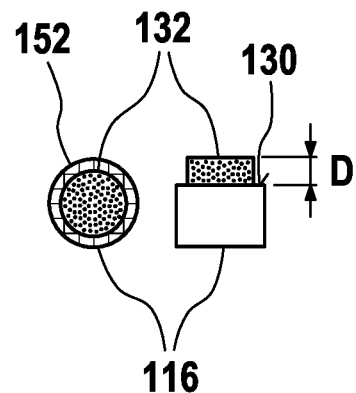
Figure 3F:
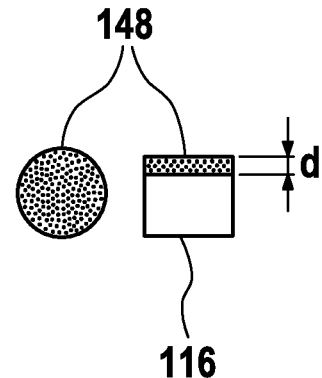

FIG. 3D shows a surface pretreatment, in which surface profiling 152 is applied to surface 130 of pressure deformation element 116. Surface profiling 152 corresponds to a latticed structure. In FIG. 3E, the application of glass element 132 is shown. The melting of glass element 132, which allows a glass layer 148 to form on surface 130, is shown in FIG. 3F. Glass layer 148 has a lower thickness d than glass element 132 (thickness D) due to the more effective bonding of the glass to this surface pattern.

Figure 3G:
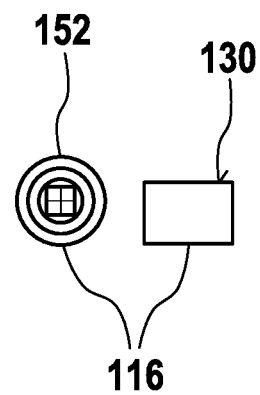
Figure 3H:
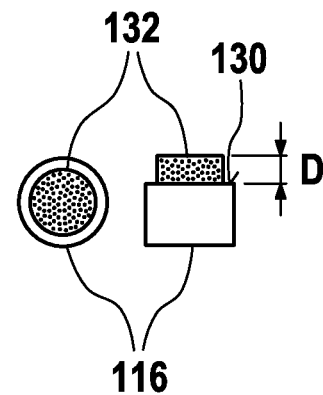
Figure 3I:
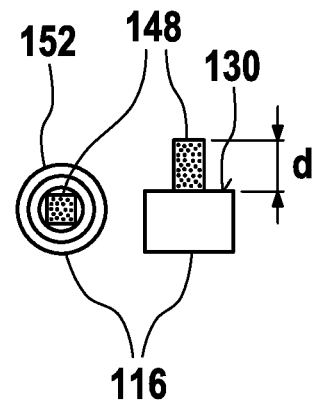

FIG. 3G shows partial surface pretreatment in the form of a combination of the variants shown above, in which limited surface profiling 158 is applied to the center of surface 130 of pressure deformation element 116. Limited surface profiling 158 corresponds to a combination of a latticed pattern and the pattern present from the preliminary processes. The application of glass element 132 is shown in FIG. 3H. The melting of glass element 132, which allows a glass layer 148 to form on surface 130, is shown in FIG. 3I. Due to the withdrawal from the untreated surface, glass layer 148 has a greater thickness d than glass element 132 (thickness D). In addition, in the top view, it is apparent that glass layer 148 in FIG. 3I may be guided by the applied patterning, and that its basic shape is now, for example, square, whereas it is evident that glass layer 148 in FIG. 3C tends towards the formation of circular shapes.

What is claimed is:

1. A method of manufacturing a sensor set-up for determining at least one pressure of a fluid medium, the method comprising the following steps:
    providing a blank of the sensor set-up, the blank of the sensor set-up including at least one pressure connection, the pressure connection including at least one pressure deformation element, the at least one pressure deformation element being made up of at least one material suitable for induction;
    positioning at least one glass element onto a surface of the at least one pressure deformation element;
    measuring at least one temperature of the at least one pressure deformation element using at least one pyrometer;
    inducing a voltage in the at least one pressure deformation element using at least one inductor in such a manner that the glass element melts and a glass layer forms on the at least one pressure deformation element; and
    positioning a sensor element onto the glass layer in such a manner that an integral bond forms between the sensor element and the glass layer.

2. The method as recited in claim 1, wherein prior to the step of positioning the at least one glass element, at least one surface profile is produced on at least the surface of the at least one pressure deformation element.

3. The method as recited in claim 2, wherein the surface profile is at least profiling selected from the group made up of: microprofiling, nanoprofiling.

4. The method as recited in claim 2, wherein at least part of the surface profile is substantially periodic surface profiling.

5. The method as recited in claim 1, wherein the method further comprises:
inserting the pressure connection into a holding fixture capable of being cooled and cooling the pressure connection using the holding fixture capable of being cooled.

6. The method as recited in claim 5, wherein a lower end of the pressure connection is cooled to a temperature of 5° C. to 25° C. using the holding fixture capable of being cooled.

7. The method as recited in claim 1, wherein the glass element has a cylindrical basic shape having a thickness of 5 μm to 100 μm.

8. The method as recited in claim 1, wherein the step of inducing the voltage d) includes a heating phase, a holding phase, and a cooling phase, and the holding phase takes place over a time frame of 2 s to 50 s.

9. The method as recited in claim 1, wherein in the step of inducing the voltage, the at least one pressure deformation element is heated to a temperature of 200° C. to 900° C.

10. The method as recited in claim 1, wherein the inducing of the voltage is performed as part of a temperature control according to the measured at least one temperature.

* * * * *